United States Patent [19]

Singer

[11] Patent Number: 4,787,559
[45] Date of Patent: Nov. 29, 1988

[54] ROCKET MOTOR EXTENDIBLE NOZZLE EXIT CONE

[75] Inventor: Victor Singer, Newark, Del.

[73] Assignee: Morton Thiokol, Inc., Chicago, Ill.

[21] Appl. No.: 897,958

[22] Filed: Oct. 10, 1986

Related U.S. Application Data

[62] Division of Ser. No. 762,472, Aug. 5, 1985, abandoned.

[51] Int. Cl.⁴ .............................................. F02K 1/08
[52] U.S. Cl. .............................................. 239/265.43
[58] Field of Search ............... 239/265.11, 265.19, 239/265.33, 265.43; 60/242, 271

[56] References Cited

U.S. PATENT DOCUMENTS

| | | | |
|---|---|---|---|
| 3,596,465 | 8/1971 | Paine | 239/265.43 |
| 3,615,052 | 10/1971 | Tumavicus | 239/265.43 |
| 4,272,956 | 6/1981 | Lamere et al. | 239/265.15 |
| 4,349,155 | 9/1982 | Donguy | 239/265.33 |
| 4,387,564 | 6/1983 | Carey | 60/271 |
| 4,426,038 | 1/1984 | Inman et al. | 239/265.43 |
| 4,638,947 | 1/1987 | Jaqua et al. | 239/265.43 |

Primary Examiner—Andres Kashnikow
Assistant Examiner—Michael J. Forman
Attorney, Agent, or Firm—Gerald K. White

[57] ABSTRACT

A rocket motor extendible nozzle is made by folding a sheet stock (metal, etc.) development of a membrane in the form of a cone or conical frustum (with a straight meridian) in such manner that the aft or larger diameter region of the membrane that is constructed by joining the two longitudinal edges may be collapsed for stowage with vastly reduced overall length, maximum diameter, and with substantially increased rigidity in comparison with the fully deployed unit. In the stowed condition, the material comprising the aft portion of the membrane is situated in multiple layers within the forward portion so that deployment is induced by forward-to-aft gas flow of the rocket motor within the cone.

7 Claims, 6 Drawing Sheets

ROCKET MOTOR EXTENDIBLE NOZZLE EXIT CONE

This is a divisional of co-pending application Ser. No. 06/762,472 filed on Aug. 5, 1985 now abandoned.

BACKGROUND OF THE INVENTION

1. Field of the Invention

The present invention relates to an improvement in an extendible nozzle exit cone for rocket motors that are designed for operation at vacuum or near vacuum conditions.

2. Description of the Prior Art

Deep space ballistic missile systems or satellite probes require high performance, low weight, and highly packageable primary propulsion systems. Excluding propellant tanks, the largest component of the propulsion system is the rocket motor exhaust nozzle. The rocket motor nozzle takes up a large amount of valuable space relative to its mass.

The exit cone of a conventional nozzle for rocket motors is designed for optimum performance at the median altitude of the intended trajectory. One of the functions of the exit cone is to provide an inclined surface against which the expanding exhaust plume of the rocket motor can bear, thereby to provide some of the forward thrust of the rocket motor. The exhaust plume grows large with increasing altitude of the rocket motor because of the lower pressures of the ambient atmosphere at the higher altitudes. At low altitudes, the exhaust plume is too small for the available surface of the exit cone. As a result, a partial vacuum tends to form on the inside edges of the exit cone, thereby creating an atmospheric drag on the rocket. At high altitudes, the exhaust plume is too large for the exit cone so that much of the potential energy is unused. A rocket motor nozzle that is sufficiently large to make full use of the expanding exhaust gases of a rocket motor in the low pressures existing at high altitudes would normally occupy an inordinately large proportion of the available storage space in silos, submarines, and between stages of a multiple-stage missile.

Various proposals have been made in the prior art to provide a large expansion ratio nozzle that can be stowed in a configuration of reduced length and thereby made to fit in a minimal space, and that can be extended to a configuration suitable for high altitude operation after motor ignition and lift off. These have included the use of:

(a) a rocket motor nozzle extension cone or skirt that is folded in a single layer inwardly and forwardly of the rocket motor nozzle when in a stowed position, and is actuated, that is, deployed to a fully extended position by forward-to-aft flow of rocket motor gas, as disclosed in U.S. Pat. No. 3,358,933 to J. H. Altseimer, and in U.S. Pat. No. 4,272,956 to G. C. Lamere et al.;

(b) an inflatable rocket motor extension cone or skirt that is folded forwardly of, that is back around the rocket motor nozzle, exteriorly thereof, and later inflated by rocket motor gas to achieve a desired frusto conical shape aft of the rocket motor nozzle, as in U.S. Pat. No. 3,596,465 to T. O. Paine et al.;

(c) a rocket motor extension cone or skirt that is folded forwardly of, that is, back around the motor nozzle, exteriorly thereof, and including a cover assembly attached to the aft or exit end of the skirt that seals the extension cone, and upon motor operation, seals the gas pressure therein sufficient to cause the skirt to unroll into its extended configuration, as in U.S. Pat. No. 3,711,027 to L. F. Carey and U.S. Pat. No. 3,784,109 to J. W. Dueringer;

(d) a rocket motor extension cone that is folded forwardly of, that is, back around the motor nozzle, exteriorly thereof, and including a plurality of mechanical actuators for causing the skirt to unroll into its extended configuration, as in U.S. Pat. No. 3,346,186 to D. L. Fulton et al., U.S. Pat. Nos. 4,125,224, 4,162,040, 4,184,238 and 4,387,564 to L. F. Carey, U.S. Pat. No. 4,213,566 to L. E. Miltenberger, and U.S. Pat. Nos. 4,383,407 and 4,489,889 to F. S. Inman;

(e) a rocket motor extension cone as described in item (d) further including a skirt attached to the aft end of the extension cone that is flared toward the interior of the extension cone when the latter is in its stowed position and is actuated into its extended configuration by a forward-to-aft flow of rocket motor gas, as in U.S. Pat. Nos. 4,125,244, 4,162,040, 4,184,238, and 4,387,564 to L. F. Carey.

There are problems with the prior art proposals for providing high performance over the entire range of intended trajectory in that they are deficient in meeting the large expansion ratios required for high altitude rocket flight while still remaining within length, weight and economic limiting constraints.

Figures 1, 2:
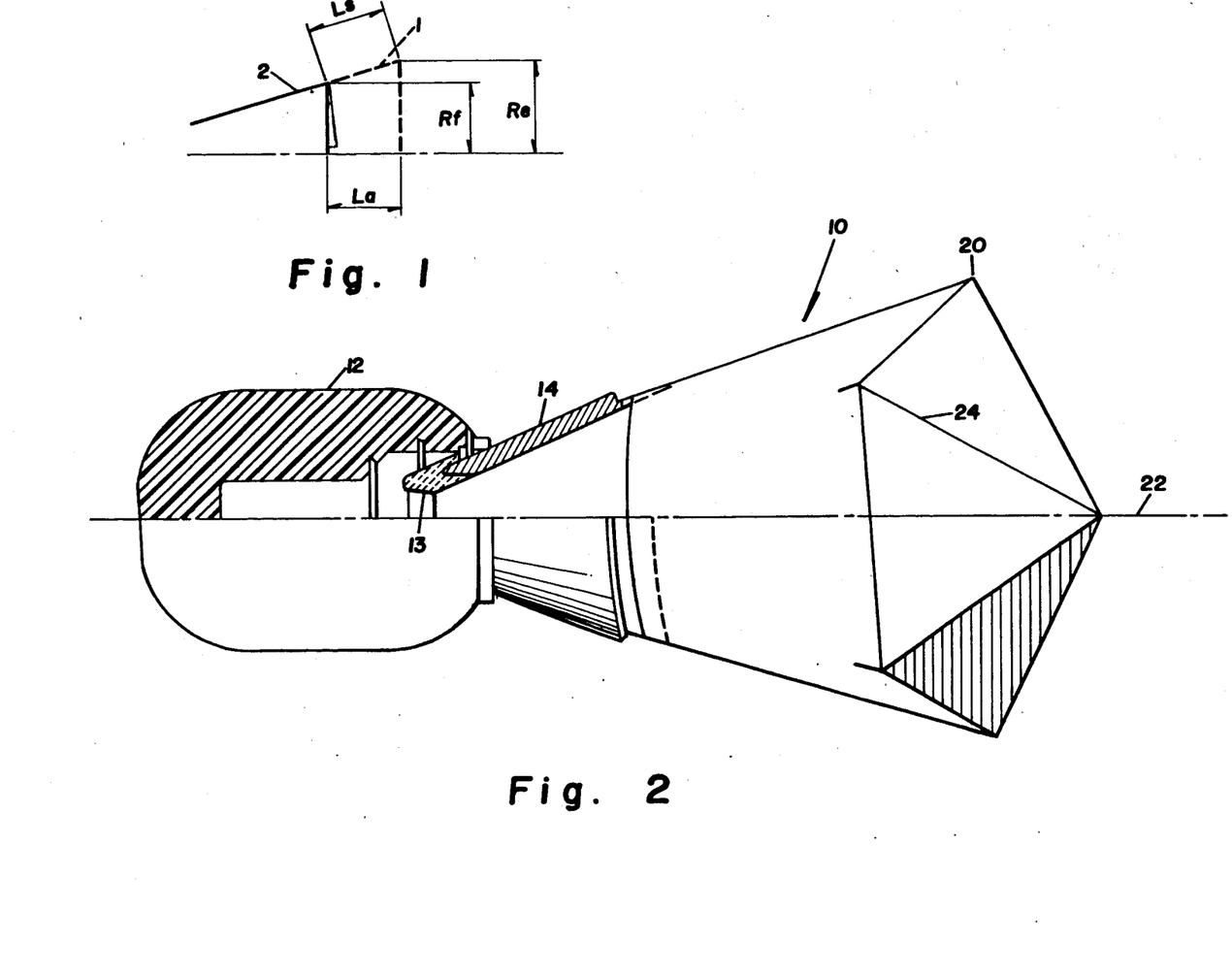
FIG. 1 is a schematic fragmented drawing illustrating certain relationships of a prior art nozzle extension as mentioned hereinbefore.
FIG. 2 is a perspective view, with a portion shown in cross section, of a rocket motor having an extendible nozzle exit cone according to the present invention, with the extendible nozzle exit cone shown in the stowed condition thereof.

Thus, with respect to the prior art mentioned in item (a) above, which prior art is schematically represented by FIG. 1 of the drawings, it is evident that since the length $L_s$ along the straight meridian of the extended cone portion 1 of a rigid cone 2 cannot exceed the radius $R_f$, the exit opening of cone 2, the length $L_a$ along the longitudinal axis 3 of the cone extension 1 must be smaller than $L_s$. This seriously limits the expansion ratio that is obtainable by the prior art of item (a) since the length $L_s$ must be short enough to fit within cone 2 in its stowed condition.

The prior art of item (b) involves the use of an inflatable extension cone consisting of two woven stainless steel interconnected panels and including a manifold connection for dumping rocket motor gas between the panels for inflating the cone. The double panel and manifold connection both add undesirably to the weight, bulk and complexity of the construction.

With respect to the prior art of item (c), the requirement for the cover assembly that is attached to the exit end of the extension skirt adds undesirably to the weight of the extension cone, the transverse load thereon, and the complexity of the construction.

The prior art of items (d) and (e) involve the use of mechanical actuators such as pneumatic cylinders that add undesirably to the weight, bulk and complexity of the construction.

The present invention is concerned particularly with a form of extendible rocket motor exit cone in which the nozzle extension is folded inwardly of itself and is characterized in its provisions for permitting the straight meridian corresponding to $L_s$ of the prior art representation of FIG. 1 to be much larger than $R_f$ or even larger than $R_e$, the radius at the exit plane of the cone extension 1. This allows a sufficient amount of membrane material for the cone extension to produce a very large area ratio at the exit plane to be stowed with substantially increased rigidity in a much reduced envelope in comparison with the prior art, and in making possible the use of thinner, and hence, lighter exit cone extension membranes.

SUMMARY OF THE INVENTION

An object of the invention is to provide an improved method for making an extendible rocket motor exit cone having a very large area ratio from a flat sheet or membrane of refractory metal or other material, which extendible exit cone may be collapsed by folding for stowage and the deployment of which lends itself to induction by a forward-to-aft gas flow therein upon motor operation.

A further object of the invention is to provide a method of folding a sheet stock (metal, etc.) development of cut arcuate membrane in the form of a cone or conical frustum, with a straight meridian, in such a manner that the aft or larger diameter region of the cone that is constructed by attaching the opposed ends in edge-to-edge relationship may be collapsed for stowage with vastly reduced overall length, minimum diameter, and with substantially increased rigidity in comparison with the fully deployed unit, and more particularly, wherein, in the stowed condition, the material comprising the aft portion of the membrane is situated in multiple layers within the forward portion so that deployment may be induced by forward-to-aft gas flow within the cone.

Another object of the invention is to provide such an improved method for making an extendible nozzle exit cone which is characterized in that in collapsing the cone, for stowage, the membrane of the extendible nozzle exit cone is folded inwardly thereof, with multiple folds, from the aft end.

Still another object of the invention is to provide an improved method for making an extendible nozzle exit cone from very thin membranes which is characterized in that, in the stowed form, the extendible nozzle exit cone is quite rigid.

A further object of the invention is to provide an improved extendible nozzle exit cone for rocket motors in which the extendible nozzle exit cone is folded inwardly thereof, with multiple folds, from the aft end thereby permitting a sufficient amount of membrane material for the nozzle extension to produce a very large area ratio at the exit plane to be stowed in a much reduced envelope, with the extendible exit cone in stowed form being quite rigid.

In accomplishing these and other objectives, the invention, in one embodiment, comprises a system of folding a sheet stock (metal, etc.) development of a cut arcuate membrane in the form of a cone or conical frustum, with a straight meridian, in such a manner that the aft or larger diameter region of the cone that is constructed by joining the two opposed straight edges may be collapsed for stowage with vastly reduced overall length, maximum diameter, and with substantially increased rigidity in comparison with the fully deployed unit. In the stowed condition, the material comprising the aft portion of the cone is situated in multiple layers within a forward portion of the cone so that deployment is readily induced by forward-to-aft gas flow from the rocket motor within the cone. The forward portion of the membrane need not be extensively folded, and for some purposes, it may be preferable not to fold it at all.

The various features of novelty which characterize the present invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

DESCRIPTION OF THE PREFERRED EMBODIMENT

In accordance with the present invention, there is provided an improved method for making an extendible nozzle exit cone for attachment to the exit end of a rocket motor nozzle. A portion of the aft end of the cone is initially folded inwardly of a forward portion thereof for collapsing the cone for compact stowage. The inwardly folded aft end is adapted to be unfolded, upon firing of the rocket motor, due to the forward-to-aft flow of rocket motor ga through the extendible nozzle exit cone. Such extension of the extendible nozzle exit cone increases the ratio of the effective rocket motor extendible nozzle exit plane area to the rocket motor nozzle throat area. By folding a portion only, for example two-thirds of the aft end within the forward end of the extendible exit cone in the collapsed condition thereof, there is provided a larger exit plane area at firing of the rocket motor for effecting a build up of sufficient pressure within the cone for fast and smooth unfolding, and hence, deployment of the cone to its extended position.

Figures 11, 12:
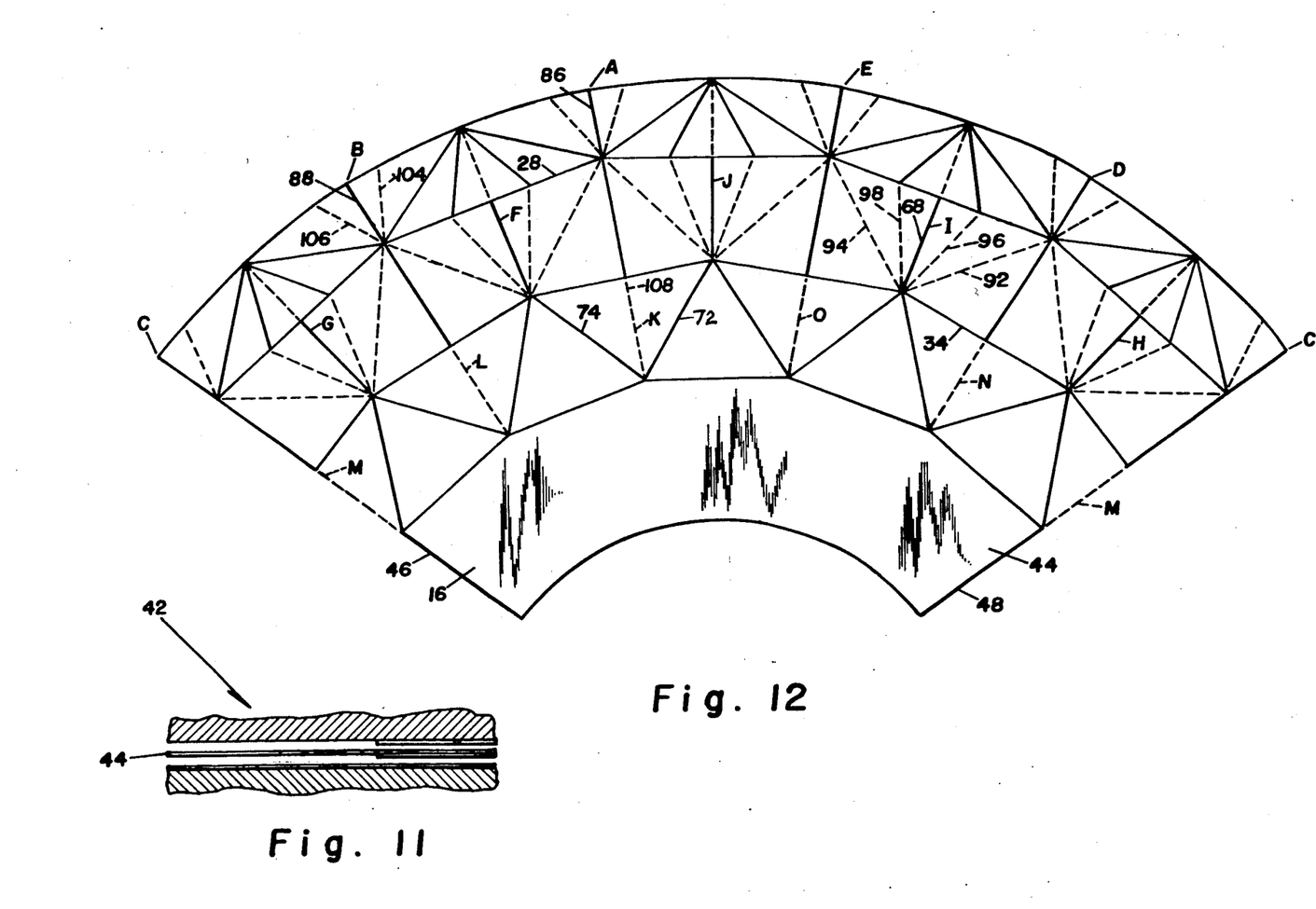
FIG. 11 is a fragmentary view illustrating the operation of the die press of FIG. 10.
FIG. 12 illustrates a brake-pressed and cut thin arcuate sheet metal workpiece that is obtained preliminary to further forming into the extendible nozzle exit cone of the invention.

The method of the present invention comprises several steps including cutting a workpiece of heat-resistant ductile material, as described hereinafter, into plan view arcuate form of appropriate size, as illustrated in FIG. 12 with opposed straight ends that may be brought into edge-to-edge relationship to form a frustum of a cone. The arcuate form of the workpiece is so selected that the smaller radius end of the frustum of a cone is suitable for attachment to the exit end of the rocket motor nozzle and the larger radius end of which is of such size as to provide the desired increase in area ratio.

Following the step of cutting the arcuate shaped workpiece of thin heat-resistant material, the workpiece is deformed over a portion adjacent the longer arcuate side to provide thereon a pattern comprising two sets of folds or creases in each of five substantially equal sectors into which the workpiece is divided, a first set of which creases points at the viewer from the exterior of the workpiece (as it subsequently is formed into the frustum of a cone), and a second set which points away from the viewer. The two sets of creases are so formed on the surface of the workpiece and in such relation with each other that when the opposed straight ends of the arcuate workpiece are attached to each other to form a frustum of a cone, the aft end of the cone is adapted for folding inwardly into a portion of the forward end in a plurality of inwardly folded layers. While the workpiece is described as being divided into five sectors, it will be understood that many more sectors than five, all of equal size, may be provided, if desired. A minimum of four sectors is necessary, however, for the folding and unfolding of the membrane to be feasible.

Further steps in the making of the extendible nozzle exit cone of the present invention include attaching the opposed straight ends of the arcuate workpiece in edge-to-edge relationship as by a single weld to form a frustum of a cone followed by axi-symmetric folding inwardly and forwardly, as by hand, a portion of the surface forward of the larger diameter or aft end of the cone in a plurality of inward folds thereby to collapse the cone for compact stowage.

FIGS. 2 through 6 depict a particular version of an extendible nozzle exit cone 10, according to the invention, for a rocket motor designated by the numeral 12. The cone 10 may be made, as hereinbefore described, by folding a flat sheet or membrane of suitably cut refractory metal or other heat and erosion resistant material.

By way of example and not limitation, it is noted that the nozzle 14 of the rocket motor 12 may have a throat 13 having a diameter of 3.85 inch. The membrane designated 16, of the deployed or extended extendible nozzle exit cone 10 may have a 17° half angle, and is attached in conventional and suitable manner (not shown) to the rocket motor cone 14 of thicker material at a diameter in the 23 to 27 inch range. The thicker cone 14 of smaller area ratio may have a half angle larger than 17°.

On the extendible membrane exit cone 10, the area ratios are 256 at the exit plane 18 and 80.3 at a point of departure designated 20, from the generally conical form. At this intermediate location 20, the aft end view of the stowed configuration is pentagonal.

Figures 7, 8, 9, 10, 14:
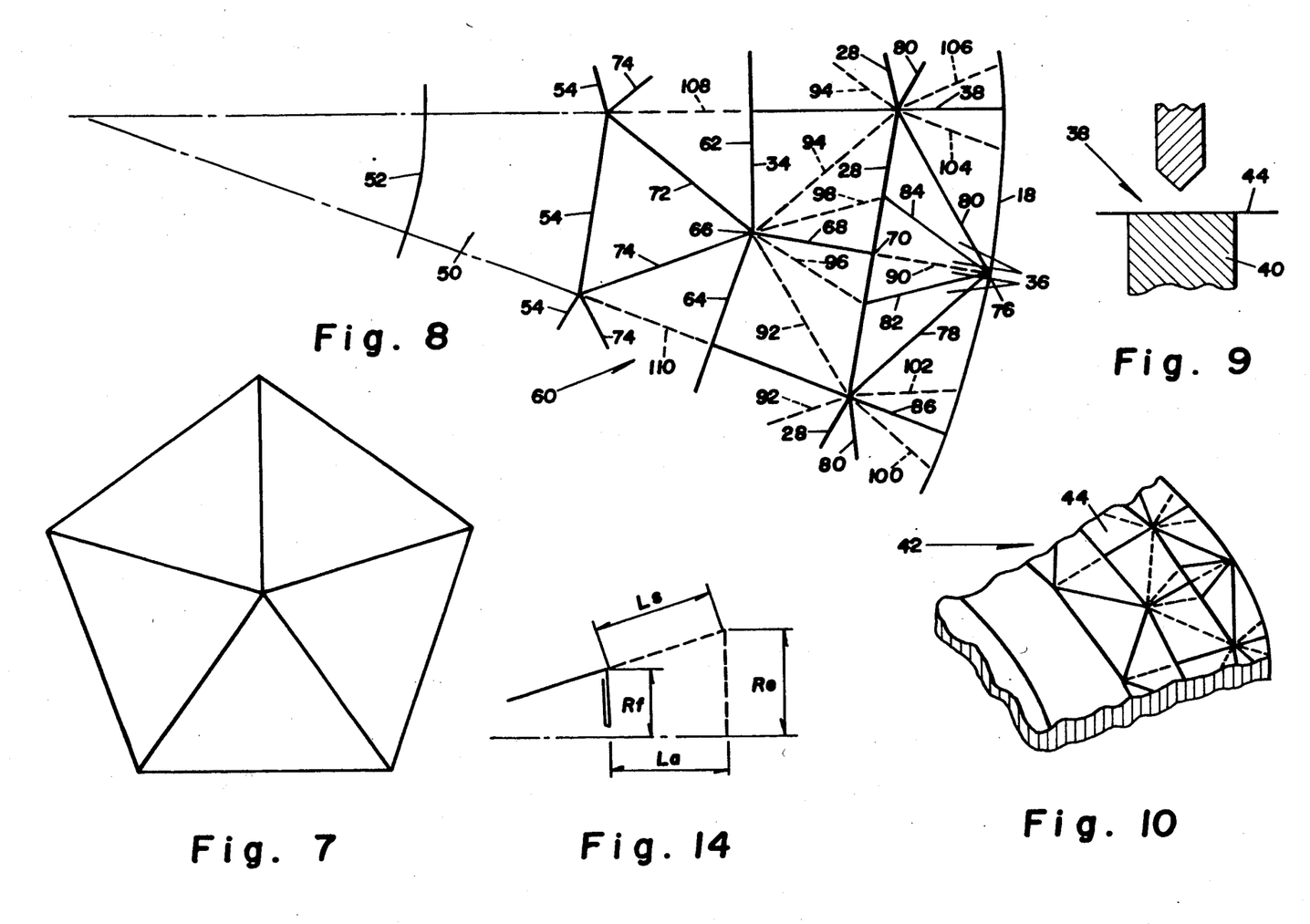
FIG. 7 is a view of the aft end of the extendible nozzle in its stowed condition.
FIG. 8 is a view of a partial plan, specifically a fifth, of the developed exterior surface of the extendible nozzle exit cone of FIGS. 2 through 7.
FIG. 9 is a fragmentary perspective view showing how a thin sheet metal workpiece may be positioned upon the table of a brake press for having fold or crease lines formed thereon.
FIG. 10 is a fragmentary perspective view showing, alternatively, how a thin metal sheet may be placed upon a die plate and crease pressed to form the fold or crease lines thereon.
FIG. 14 is a schematic drawing illustrating certain relationships of the extendible nozzle exit cone according to the invention as contrasted with corresponding relationships of the prior art illustrated in FIG. 1.

One-fifth of the developed surface of the cone, showing fold or crease lines and fold directions, is shown in FIG. 8.

FIG. 2 illustrates the fully stowed condition of the extendible exit cone 10. The overall reduction of length at the longitudinal axis 22 of the extendible cone 10, is about 115% of the exit plane radius, and more than 200% of the deployed radius at the intermediate location 20. This is more than twice what has been accomplished in the prior art, as represented by FIG. 1. The free length of the conical membrane 16 between where it clears the attachment to the rocket motor nozzle 14 and the location 20 of the departure from generally conical form is about 16 inches.

As those skilled in the art will understand, greater or lesser deployed-to-stowed condition envelope reductions, and forms with larger or smaller exit plane area ratios, may be achieved through alterations of the angular frequency, the number of approximately circumferential folds, and the distances between adjacent folds. In the fully stowed condition, as shown in FIGS. 2 and 7, the folds at the aft end of the extendible cone 10 form a pyramid 24 with the apex thereof on the longitudinal axis 22, which pyramid 24 closes the exit end of the cone 10. This closure of cone 10 is sufficiently tight that upon initiation of operation or firing of the rocket motor 12, the resulting pressurization within the cone and forward-to-aft flow of gas causes the folds of cone 10 to unfold and to deploy the cone 10 to its fully extended condition in a smooth sequence of opening the successive folds and layers.

Figure 3:
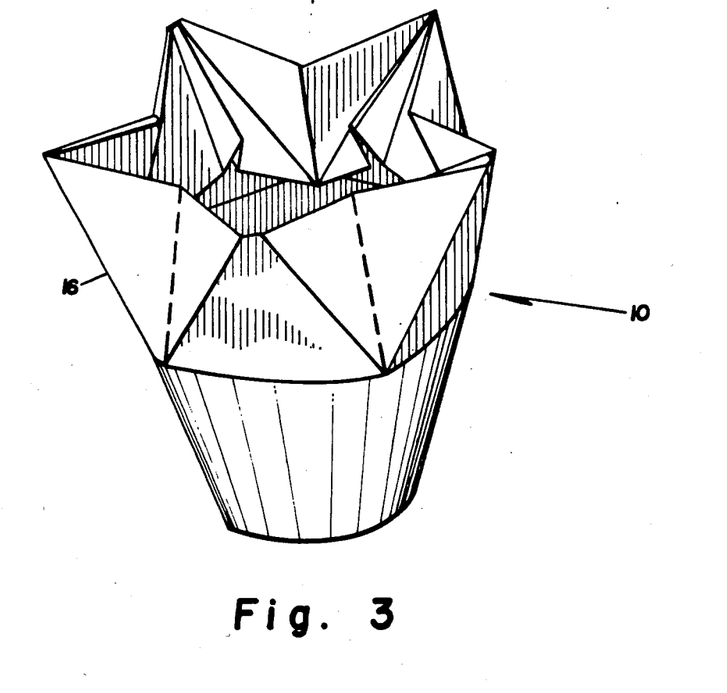
FIGS. 3 through 6 show the extendible nozzle exit cone of FIG. 2 in various stages of deployment thereof.

FIG. 3 illustrates the situation as deployment begins. The approximately radial features or folds indicated at 26, which catch the gas as forward-to-aft flow begins, are clearly visible. Each side of these radial features 26 is composed of a zone between the exit plane and the second approximately circumferential fold, indicated at 34, at midwidth of the one-fifth of full development region shown in FIG. 8. Each radial feature 26 consists of two layers of membrane 16.

Figure 4:
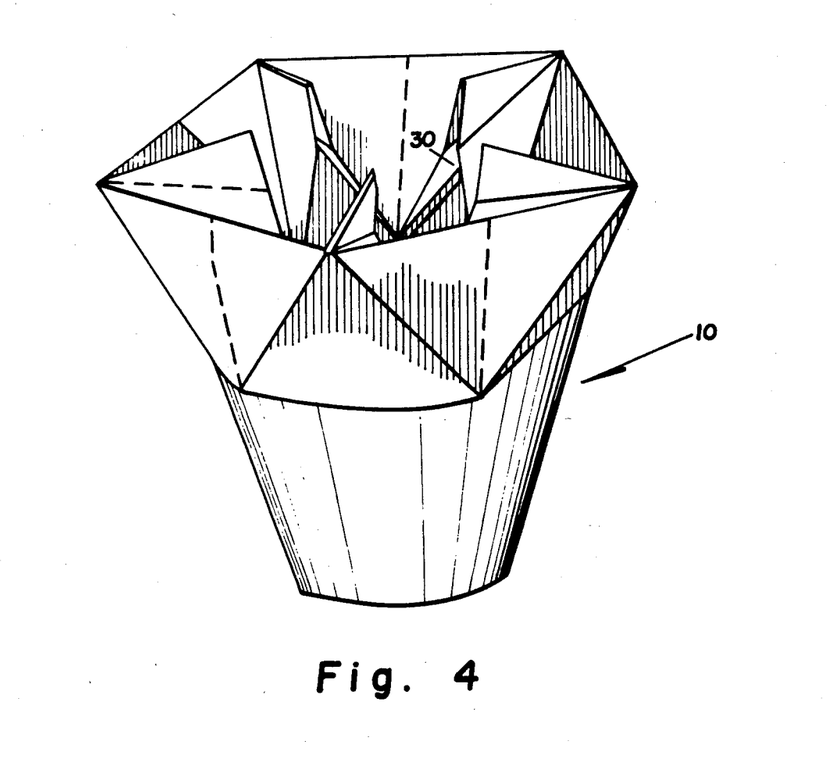
Figure 5:
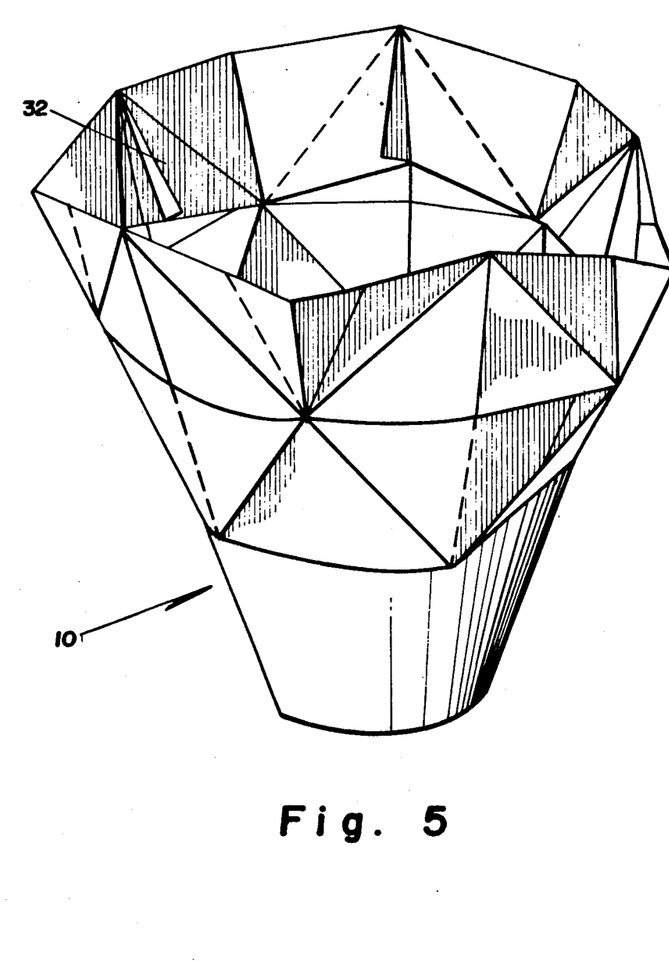
Figure 6:
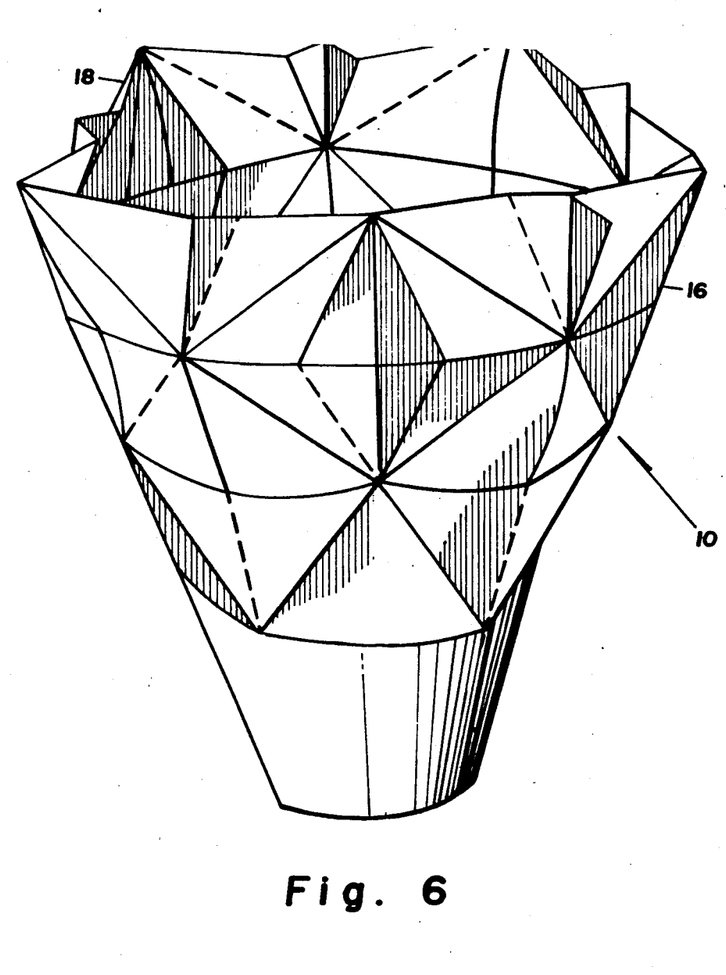

FIGS. 4 and 5 illustrate the approximately radial features 30 and 32, respectively, that continue to be exposed during deployment. These radial features 30 and 32 capture the gas which forces the continuation of unfolding and deployment. In FIG. 6, all that remains to be accomplished for complete deployment is the development of a sufficient rate of flow of forward-to-aft gas within the membrane 16 of exit cone 10 to force it to the stable circular form In most of the extendible exit cone 10 described in connection with FIGS. 2 through 6, three layers of the material of membrane 16 are in contact in the stowed condition. The triangular zones 36 between the exit plane 18 and first approximately circumferential fold indicated at 28 and adjacent to the boundaries of the one-fifth of full development region, as seen in FIG. 8, form a small region where five layers of the material of membrane 16 are in contact in the stowed condition.

In the partial plan development of the exterior surface of the extendible exit cone 10, as shown in FIG. 8, fold lines are shown either as solid lines or dotted lines. Those shown solid have the apex thereof pointing toward the viewer. Those shown dotted have the apex pointing away from the viewer.

In accordance with the invention, the pattern of folds or creases, as shown in FIG. 8, may be made in an appropriately cut membrane 16 of arcuate shape forming a workpiece 44 by means of a brake press, as schematically illustrated in FIG. 9. A brake press is a well known device in the art and is widely used for bending and producing shapes from ferrous and nonferrous metal sheets and plates. Particular advantages of a brake press are its versatility, the ease and speed with which it can be changed from one set up to another, and low costs of tooling. A brake press is a slow speed punch press having a long relatively narrow bed or table and a ram mounted between end housings. The rams may be actuated mechanically or hydraulically.

For facilitating the brake press operation, it may be desirable to use a conventional brake press modified in a manner well known to those skilled in the art. Thus, there is a need to control the length of the edge on the table 40 of the brake press 38, as shown in FIG. 9, to accommodate the several lengths of the different creases. Thus, it is contemplated to modify the brake press 38 by the use of several tables 40 each with an edge of the required length and which may be substituted, one for another, in making the folds or creases in the membrane 16.

As those skilled in the art will understand, also, the pattern of folds or creases may be formed in the membrane 16 by means of a die press 42, as shown in FIGS. 10 and 11, the membrane 16 being laid upon a die plate and crease-pressed. The die press 42 may be selected, as desired, to make the required creases on both sides of the sheet or workpiece 44 of membrane 16, as shown in FIG. 12, in one die pressing operation, or only one-fifth thereof, as shown in FIG. 8, in each of five successive die pressing operations.

FIG. 12 illustrates a brake-pressed, or die pressed, and cut membrane sheet or workpiece 44 showing the plurality of bends or creases that have been formed in the membrane 16.

Following the brake pressing or die pressing operation, the opposed straight ends 46 and 48 are attached to each other in any suitable manner, as for example, by a single weld, to form the extendible exit cone 10.

By reference to FIGS. 8 and 12, it will be seen that the pattern of creases or folds that is formed on the workpiece 44 of FIG. 12, from which cone 10 is formed, comprises spaced first, second and third approximately circumferential fold or crease lines 28, 34 and 54, respectively. The first fold line 28 and the third fold line 54 extend completely across the width of the sector designated 60 shown in FIG. 8 comprising one-fifth of the complete arcuate workpiece 44 shown in FIG. 12. The second fold line 34 of sector 60 is comprised of two crease lines 62 and 64 that meet at an angle at a midpoint 66 on sector 60 and extend in opposite directions to respective midpoints of adjacent sectors that are identical to sector 60. While the lines or creases 28, 54 and 34 (formed by creases 62 and 64) are straight, they form approximately circumferential fold lines over the width of the workpiece, as shown in FIG. 12. As shown, the three fold lines 28, 34, and 54 are approximately equidistant from each other with the first fold line 28 being substantially the same distance from the junction of crease lines 62 and 64 as from the longer arcuate outer edge of the sector 60.

The fold or crease lines 28, 54, 62 and 64 comprise several of a first set of crease lines formed in the workpiece 44 in respect of which the apex of the fold points at the viewer. Other crease lines of such first set of crease lines comprise a line 68 that connects the junction 66 of crease lines 62 and 64 to the midpoint 70 of fold line 28 and lines 72 and 74 that connect the junction 66 to a respective end of fold line 54. Still others of the crease lines of the first set of crease lines connect the midpoint 76 of the longest arcuate line of sector 60 to the ends and spaced intermediate points on the fold line 28. These are crease lines 78, 80, 82 and 84. Additional crease lines 86 and 88 connect a respective end of fold line 28 to the longest arcuate line of sector 60.

Crease lines of a second set of crease lines have an apex that point away from the viewer. These include a crease line 90 that connects the midpoint 76 on the arcuate line of sector 60 and the midpoint 70 on the first fold line 28. Other such crease lines include lines 92, 94, 96 and 98 that connect the midpoint 66 of the second fold line 34 to the ends and intermediate points on the first fold line 28. Crease lines 100 and 102 connect one end of fold line 28 to the longest arcuate side of sector 60 and crease lines 104 and 106 connect the other end of fold line 28 thereto.

Figure 13:
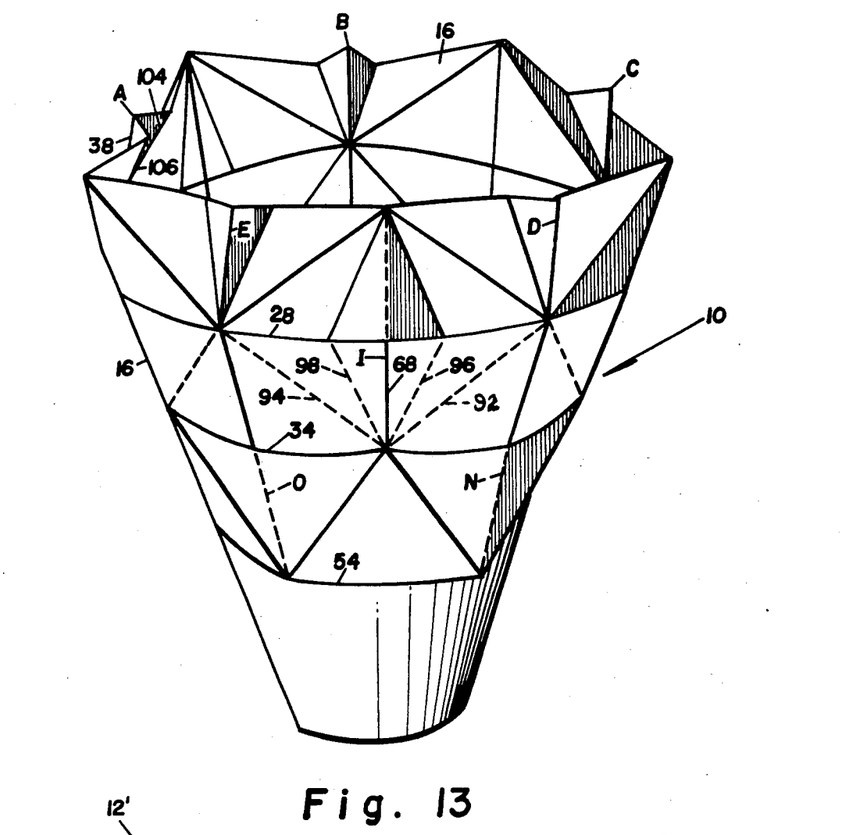
FIG. 13 illustrates a manner of folding the membrane axi-symmetrically at the several fold lines beginning with the aft end of the extended cone in collapsing the aft end of the cone for stowage in a forward portion thereof.

FIG. 13 illustrates how the membrane workpiece of FIG. 12, when formed into exit cone 10, may be folded inwardly upon itself progressively and axi-symmetrically from the aft end to the point of departure 20 on the forward end whereby to place the extendible cone 10 in the stowed condition thereof. Such folding may be done by hand.

The folds for initiating the inward folding of the extended cone 10 about the approximately circumferential fold line 28 have been indicated in FIGS. 12 and 13 by the letters A through E. Alternate ones of the folds, for example, folds A, C, E, B and D are pinched, in turn from the outer surface of the membrane 16. Specifically, pinching fold A causes the membrane 16 to fold outwardly along the crease line 88. This facilitates inward folding along the crease lines 104 and 106. Pinching each of the other folds C, E, B and D, in turn, enables the membrane 16 to be similarly folded in the sectors in which those folds are located. The pinched folds may then be folded inwardly, one after the other, along the approximately circumferential fold line 28. The order of such folding may be the same as that in which they were pinched, that is, in the order of A, C, E, B and D. With a first inward layer so produced, the appearance of the cone 10 is substantially the same as shown in FIG. 5.

A substantially identical procedure may be followed for effecting the inward folding of the aft end of the cone in a second layer. Thus, as best seen in FIG. 12, the folds for effecting this operation are designated by the letters F through J. Of these folds, only the fold I is visible in FIG. 13. Pinching fold I causes the membrane 16 to fold outwardly along the crease 68, as seen in FIG. 12. This facilitates folding of membrane 16 inwardly along the crease lines 96, 98 and 92, 94. Here, again, folding of alternate ones of the folds is effected, in the order of F, H, J, G and I, for example. Upon completion of such folding, the folds F through J may then be folded inwardly, one after the other, along the approximately circumferential fold line 34. Such inward folding of the folds may be in the same order in which they were pinched. The appearance of the cone 10 with the second inwardly folded layer is substantially the same as shown in FIG. 4.

Folds for effecting the folding of the aft end of the cone 10 about the approximately circumferential fold line 54 have been designated by the letters K through O in FIG. 12. Again, alternate ones of the folds, in the order, for example, of K, M, 0, L, and N, are effected, one after the other, by folding outwardly at creases 72 and 74 and inwardly at the crease 108. Of these folds, only the folds N and 0 are visible in FIG. 13. At an intermediate stage in this folding procedure, the appearance of the cone 10 is substantially the same as shown in FIG. 3. Upon the completion of such folding, the extendible cone is in a collapsed condition for stowage as illustrated in FIG. 2 and with the aft end thereof appearing as shown in FIG. 7.

For convenience, the foregoing manner of inward folding of the extendible exit cone is referred to herein as "axi-symmetrical" folding.

In FIG. 14 there is shown a schematic drawing illustrating certain relationships of the nozzle extension cone 10 according to this embodiment of the invention described in connection with FIGS. 2–13 and which distinguish significantly from corresponding relationships, as described hereinbefore, in connection with the prior art representation of FIG. 1. By reference to FIG. 14, it will be seen that since the meridian length $L_s$ is stowed in multiple layers, the length $L_s$ may be much larger than the radius $R_f$ at the exit opening of the portion of cone 10, designated 50, that is not folded. This portion, as seen by reference to FIG. 8, is that portion between the forward cut off 52 of membrane 16 and the 3rd approximately circumferential fold line designated 54. It is noted, that if desired, $L_s$ may be larger than $R_e$, the radius at the exit plane 18 of the extendible cone 10. As described hereinbefore in connection with the prior art representation of FIG. 1, the length $L_s$ of the prior art cannot exceed $R_f$.

Figure 15:
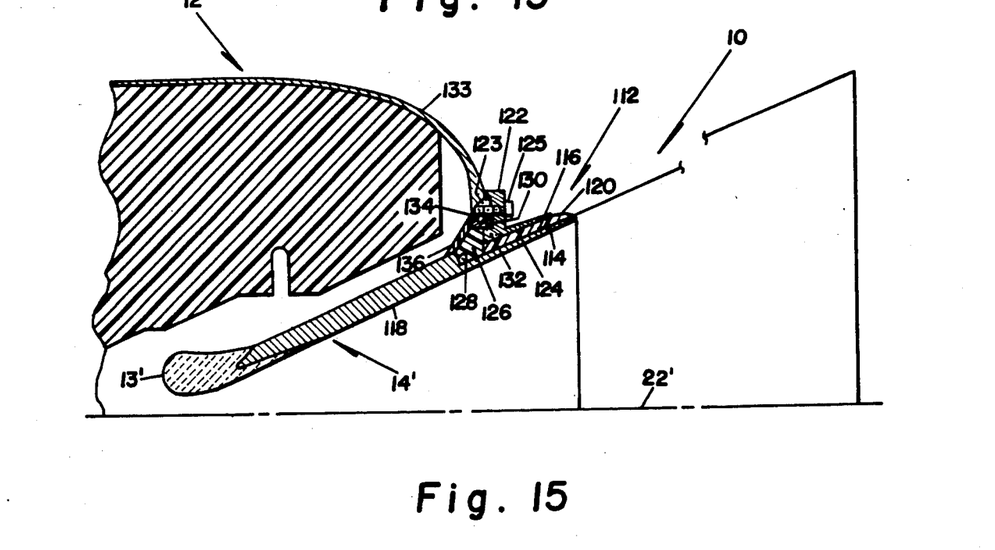
FIG. 15 is a fragmentary view illustrating a trapped supporting system for the extendible nozzle of the invention.

In FIG. 15 there is depicted, in a fragmentary view, a section of the folded cone extension 10 with a trapped supporting system 112 for the attachment thereof to a rocket motor 12'. Specifically, a forward portion 114 of the extendible cone 10 is trapped between the outer aft surface 116 of the cone of a submerged nozzle 14' of the rocket motor 12' and an annular conical band of plastic insulation 120. Surrounding the annular band of insulation 120 is an annular titanium closure 122 having an inner surface 124 that fits snugly over the outer surface of the plastic band 120. Titanium closure 122 is attached to an aftwardly projecting rim 123 of the rocket motor case 133 by a plurality of suitably circumferentially spaced bolts 125.

For supporting the cone extension 10 in a proper positional relationship with respect to the cone of the rocket motor nozzle 14', there is provided a five-sided plastic ring 126. Plastic ring 126 desirably may be made in four separate sections for facilitating the assembly of the trapped supporting system 112. On the aft side thereof, as seen in FIG. 15, the plastic ring 126 is in abutting relationship with the annular band of plastic insulation 120 and the closure 122. On the forward side thereof, the five-sided plastic ring 126 is in abutting relationship with an annular shoulder 128 on the rocket motor con 118. A titanium ring 130 having a circumferential groove 132 is slipped over adjacent circumferential surfaces of the titanium closure 120 and the plastic ring 126. An O-ring 134 which may be made of rubber or other suitable elastomeric material is provided in the groove 132 for sealing the interface between the rocket motor case 133 and the assembly 112. An annular plastic band 136 may be attached by a suitable adhesive t the adjoining surfaces of the rocket motor cone 118, plastic ring 126 and titanium ring 130.

The membrane 16 employed in the fabrication of the extendible nozzle cone 10 may be made of any suitable ductile, heat and erosion resistant metal or alloy. Metal alloys preferred for this construction are:

Columbium 10% Hafnium

Columbium 10% Tungsten 10% Hafnium 0.1% Yttrium (melting point approximately 4350° F.)

Tantalum 10% Tungsten (melting point approximately 5500° F.)

Each of these metal alloys is available in sheet stock. In 0.005 inch thickness, the weight of the first Columbium-based sheet is equivalent to about 0.033 inch 2D carbon-carbon and the weight of the tantalum-based sheet is equivalent to about 0.058 inches of 2D carbon-carbon (the term 2D meaning two-dimensional).

In summary, it is noted that the embodiment of the invention herein disclosed permits a sufficient amount of membrane material to produce a very large area ratio at the exit plane to be stowed in a much reduced envelope in comparison with the prior art. Thus, as shown in FIG. 1 which represents the prior art, since the length, $L_s$, along the meridian of the extendible cone, cannot exceed the radius, $R_f$, at the region of attachment of the extendible cone to the rocket motor nozzle, the length $L_a$ along the longitudinal axis of the extendible cone must be smaller than the length $L_s$.

With the present invention, as represented by the schematic drawing of FIG. 14, it will be seen that since the length $L_s$ is stowed in many layers, the length $L_s$ may be much larger than the radius $R_f$ at the region of attachment of the extendible cone to the rocket motor nozzle, or even larger than the radius $R_e$ at the exit plane of the extendible cone.

In the illustrated embodiment of the invention, because of the reduced length of the forward portion of the cone, and because the stowed aft portion maintains the shape at the interface, the stowed form of the cone 10 is quite rigid. Without such rigidity, the membrane exit cone is not usable at all because it is too flimsy prior to motor ignition.

Because the required stiffness of the non-folded exit cone membrane is determined by pre-use inertia loading (i.e., prior to the development of internal pressure which stiffens the structure during use), the invention makes possible the use of thinner, hence lighter, exit cone membranes than would otherwise be possible. Thus, the maximum achievable exit diameter that is practicable (before weight increase requires a greater increase of impulse than the area ratio permits) is made larger.

With this description of the invention in detail, those skilled in the art will appreciate that modifications may be made to the invention without departing from its spirit. Therefore, it is not intended that the scope of the invention be limited to the specific embodiments illustrated and described. Rather, it is intended that the scope of the invention be determined by the appended claims.

What is claimed is:

1. A rocket motor extendible nozzle for attachment to a rocket motor nozzle having a longitudinal axis and a throat area for increasing the ratio of the effective rocket motor nozzle/extendible nozzle exit cone effective area to the rocket motor nozzle throat area comprising:

an arcuate-shaped membrane of ductile heat resistant material, said membrane having opposed arcuate sides one of which is longer than the other and having ends that are adapted to be brought into edge-to-edge relationship to form a frustum of a cone having an aft end and a longitudinal axis in alignment with the longitudinal axis of the rocket motor nozzle, said membrane having a portion forming the aft end of said frustum of a cone, said membrane portion being deformed by a plurality of cooperating crease lines of first and second sets, each of the crease lines of said first and second sets having an apex, with the apex of each of the crease lines of the first set pointing at a viewer from the exterior of the membrane as formed into a frustum of a cone and the apex of each of the crease lies of the second set pointing away from the viewer, the crease lines of said first set running both transversely and longitudinally of said frustum of a cone with respect to the longitudinal axis thereof and the crease lines of the second set running longitudinally only thereof whereby said frustum of a cone may be folded inwardly, axi-symmetrically thereof, in multiple layers from the aft end thereof for compact stowage relative to said rocket motor, and whereby said extendible nozzle may be unfolded to the extended position thereof by a forward-to-aft flow of rocket motor gas therethrough upon firing of said rocket motor.

2. A rocket motor extendible nozzle as specified in claim 1 wherein said membrane is formed of an alloy comprising Columbium and 10% Hafnium.

3. A rocket motor extendible nozzle as specified in claim 1 wherein said membrane is formed of an alloy comprising Columbium, 10% Tungsten, 10% Hafnium and 0.1% Yttrium.

4. A rocket motor extendible nozzle as specified in claim 1 wherein said membrane is formed of an alloy comprising Tantalum and 10% Tungsten.

5. A rocket motor extendible nozzle as specified in claim 9 wherein the deformation of said membrane by said cooperating crease lines of first and second sets is in a pattern that is repeated in each of at least four substantially equal sectors into which said arcuate-shaped membrane is divided.

6. A rocket motor extendible nozzle as specified in claim 5 wherein said pattern is repeated in each of five sectors into which said arcuate membrane is divided.

7. A rocket motor extendible nozzle as specified in claim 6 wherein creases of the first set form fold lines that are approximately concentric with the arcuate sides of said membrane, the first one of said fold lines being closest to the longest arcuate side of said membrane, the third one of said fold lines being closest to the shortest arcuate side of said membrane, and the second one of said fold lines being approximately equidistant from said first and third fold lines, the width of the regions between the longest arcuate side of said membrane and the first fold line, the first and second fold lines and the second and third fold lines being approximately the same, the second one of said fold lines comprising two creases which meet at a small angle to each other at substantially an intermediate point across the width of the sector and overlap into adjacent sectors, others of said creases of said first set connecting the junction of the creases of said second fold line to a midpoint of the sector of the first fold line and the ends of said third fold line, still others of said creases of said first set connecting a central point on the longest arcuate line of the sector to the ends of said first fold line and to points thereon intermediate the center and the ends of said first fold line, others of said creases of said first set connecting the ends of said first fold line to said longest arcuate line of said sector, said creases of said second set connecting said central point on the longest arcuate line of the sector to a central point on said first fold line and connecting said longest arcuate line from a point adjacent each side of the sector to the ends of said first fold line and connecting the junction of the creases of said second fold line to the ends of said first fold line and the points on said first fold line intermediate the center and the ends thereof.

* * * * *